INVENTORS
IRVING H. COHN
FRANK DENARDO

BY
ATTORNEY

United States Patent Office 3,527,096
Patented Sept. 8, 1970

3,527,096
ATTITUDE ERROR CORRECTION FOR A FLUID GAUGING SYSTEM
Irving H. Cohn, Yonkers, N.Y., and Frank De Nardo, Middlebury, Vt., assignors to Simmonds Precision Products, Inc., Tarrytown, N.Y., a corporation of New York
Continuation-in-part of application Ser. No. 589,631, Oct. 26, 1966. This application June 26, 1969, Ser. No. 836,886
Int. Cl. G01f 15/02, 23/10
U.S. Cl. 73—309          5 Claims

ABSTRACT OF THE DISCLOSURE

An aircraft fuel gauge having a servo-rebalanced buoyant liquid level probe. The mass signal derived from the probe is corrected for density variation by an error signal from a densitometer, and the corrected signal is indicative of the volume. The volume signal is corrected for pitch, roll and acceleration in an AND/OR matrix to provide a correction signal for an indicator for the mass signal.

---

Figure 1:
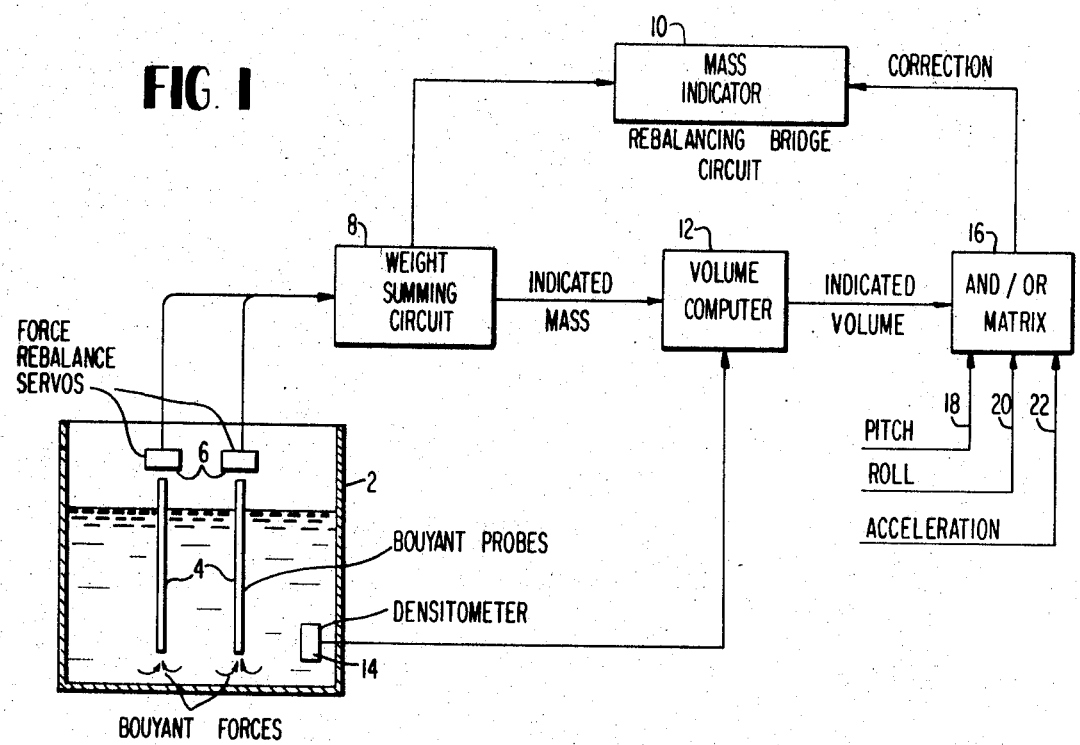

This application is a continuation-in-part of application Ser. No. 589,631, filed Oct. 26, 1966, now Pat. No. 3,463,980, issued Aug. 26, 1969.

This invention relates to an attitude error correction system for fluid gauging in which a unique computer programming system cancels errors caused by attitude variations of the fluid with respect to its container and thereby provides a corrected indication of the quantity of fluid in the container.

In fluid gauging systems, particularly those systems for measuring aircraft fuel volume or weight, the sensing system is designed to minimize errors due to the aircraft's attitude, that is, its pitch and roll. Normally, sensing systems currently used consist of an appreciable number of capacitive sensing elements distributed in the fluid container, or tank, which is usually of an irregular shape. These sensing elements are then profiled, that is, their respective capacitances are varied with the height of the container in order to provide a current for a servo bridge indicator circuit which is linear with either volume or mass as desired.

Profiling of the capacitance sensor is normally determined by means of computer studies which optimize the capacitance probe sensors at the required attitudes of the aircraft, and one of the results of such computer studies is a series of listings of calculated error at each fluid height and each required aircraft attitude. Experience has shown that the actual error in measurement obtained during testing with aircraft closely follows that predicted by the computerized results. It is, therefore, the purpose of this invention to utilize these error tabulations in order to correct indicated readings derived from a buoyant probe type of fluid quantity gauging system and to provide a system in which all errors caused by attitude variations of the aircraft are reduced to substantially zero. In a system employing a buoyant probe, weight is being measured, that is, the weight of the probe; consequently, such probes are sensitive to changes in the gravitational level due to aircraft acceleration. With the present system, according to this invention, the necessary correction for attitude can be effected in addition to correction for acceleration changes, thus making it attractive to utilize buoyant probe type fluid gauges in an aerospace environment.

Accordingly, it is an object of this invention to provide a high speed computerized error correction system for use with a fluid gauging system employing buoyant probe, or float-responsive, techniques.

It is yet another object of this invention to provide an error correction system which utilizes digital techniques for correcting errors due to changes in attitude and acceleration of an aircraft utilizing buoyant probe fuel gauging systems.

It is yet another object of this invention to provide an error correction system for attitude in aircraft to be used with a fuel gauging system in order to provide an accurate indication of the quantity of fuel regardless of the attitude of the aircraft or the apparent pitch and roll changes due to twist and deflection of the fuel tanks caused by fuel weight and aerodynamic loading.

It is still another object of this invention to provide an attitude correction system for use with a buoyant probe type of fuel gauging system that can employ a relatively small number of such probes within the container of fuel.

In carrying out the objectives of this invention it is necessary to have available on a real time basis an indication of the actual aircraft pitch and roll. These indications may be obtained from either the aircraft attitude sensors or from suitable stable sensing devices employed for this particular purpose. A computer system is provided for listing a series of calculated errors at each fluid height (or volume) and each required aircraft attitude. The terms "volume" and "height" are used interchangeably since one output from the computer studies is a tabulation of height v. volume for all attitudes required. The attitude sensor inputs to the computer are compared with the inputs indicating the fuel volume which is derived from the buoyant probe fuel gauging system and from a densitometer, and with the previous knowledge of actual errors obtained from the computer studies, correction will be made by way of a correction signal input to a suitable mass indicator.

Figure 2:
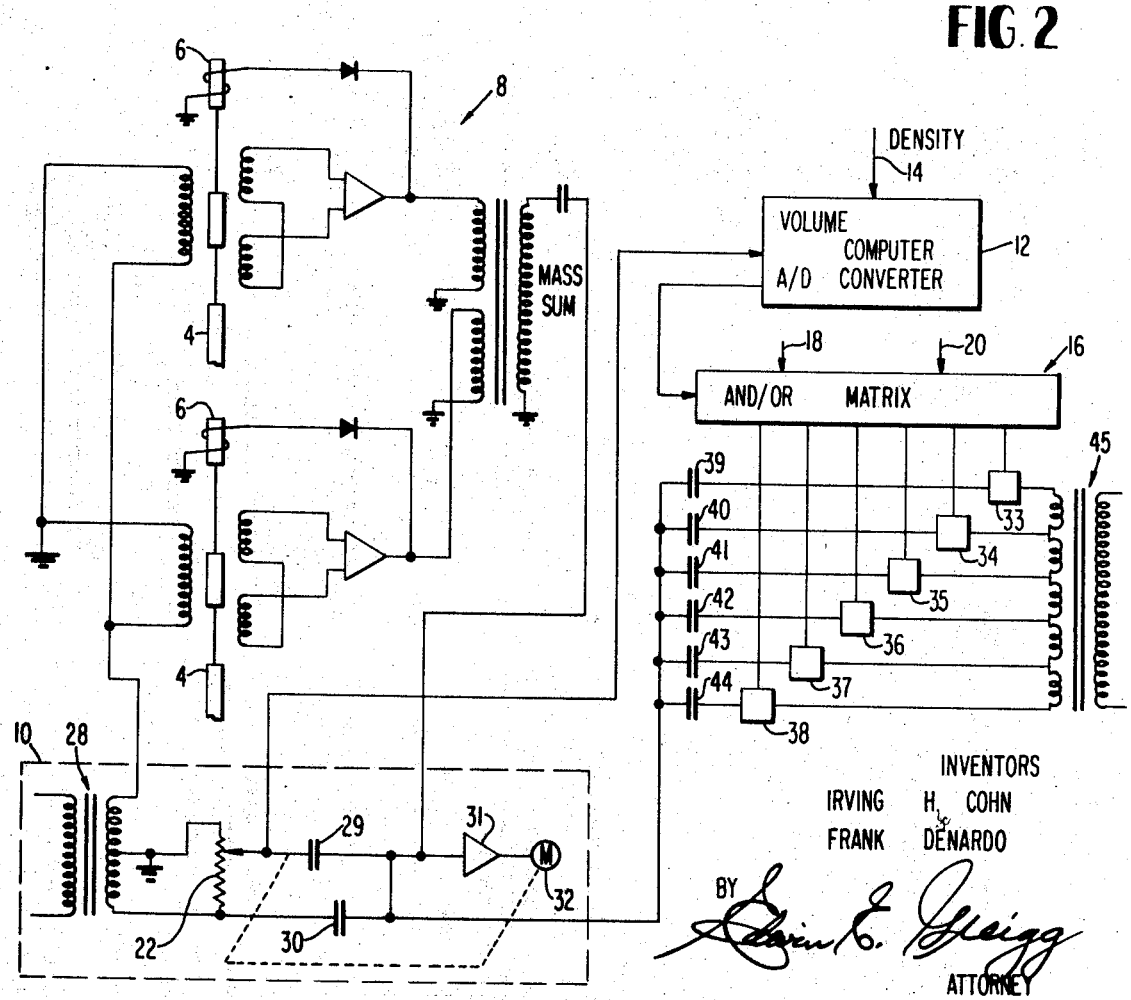

Other objects and advantages of this invention will become apparent from a further study of the specification and drawings in which:

FIG. 1 is a symbolic diagram of a system arranged according to the concepts of this invention; and FIG. 2 is a schematic illustrating circuitry details of the system shown in FIG. 1.

Referring now to the drawings, there is shown an all digital system in which a container, or tank 2, having a quantity of fuel therein is located in the aircraft (not shown). A suitable number of buoyant probes 4 are positioned within the interior of the tank according to conventional methods of construction. Adjacent to each of respective ends of the buoyant probes 4 is a suitable force-rebalancing servo mechanism 6. A change in the weight of fuel due to fuel consumption causes a buoyant force on the bottom of the probes which is then rebalanced by the servo 6 on the top, and a downward force exerted by the servo is then a measure of indicated fuel weight. Such force balance servos of conventional design by way of example could comprise a displacement transducer of the differential transformer type coupled to a suitable solenoid which opposes the buoyant force. The displacement transducer senses the slight movement of the probe from a reference position caused by a change in the buoyant force and thus changes the solenoid current to bring the probe back to the reference position. A measure of the solenoid current will then be proportional to total fuel weight. Another conventional method would be that described in the W. F. O'Connor Pat. No. 3,269,184 wherein the force of displacement on the buoyant probe or float due to changes in fuel level is transferred through an actuating member which results in slight upward or downward deflection which is caused to vary the resistance in a conventional strain gauge element thereby resulting in a variation in output of the electrical signal associated therewith. The signals derived from each of the force rebalancing servos 6 are fed to a suitable weight summing circuit 8, the output of which is proportional to total fuel weight thus providing an indicated mass digital signal that is fed to a suitable indicator 10 to be described below, and a volume computer 12. An indicated volume digital signal is derived from the indicated mass signal from the weight summing circuit 8 and from a densitometer 14 located inside the tank 2. The indicated digital volume signal is then applied to an AND/OR matrix 16 which serves to look up the error previously stored and to be more fully explained below.

The AND/OR matrix receives a set of pitch and roll digital signals. Pitch and roll attitudes are understood to be the attitude of the fuel surface with respect to a plane through the aircraft which is parallel to the ground when the aircraft is at ground attitude. The aircraft attitude sensor will provide readings under all conditions of pitch attitude except during pitch changes. The required roll attitudes may be obtained from a suitable pendulum-type or spirit level-type sensor. As an example, the aircraft may be rolled to +20°, but if it is in a controlled turn, the fuel surface attitude may be zero. Thus, utilizing digital techniques, these attitude signals are fed along digital lines 18 and 20 into the AND/OR matrix 16. Simultaneously, the fuel volume input signal is introduced into the AND/OR matrix from the volume computer 12, as well as the additional input signal 22 responsive to acceleration of the aircraft. For the latter signal, any suitable acceleration response signaling device may be provided in accordance with procedures well known in the art.

The input signals to the AND/OR matrix 16 will then combine pitch, roll, volume and acceleration, all of which occur simultaneously and which can be shown from a preselected set of computer error curves to have associated therewith a particular known error. When any one of a given number of combinations of signals occur, one or more AND gates are fired which, in turn, provide the correctional signal to mass indicator 10.

As described in parent application Ser. No. 589,631, above referred to, and as shown more specifically in FIG. 2, the mass indicator 10 may be of the conventional analog type and, accordingly, it will suffice to only summarily describe this operation. The mass gauge 10 comprises a transformer 28 with one end terminal of its secondary winding connected to the input of the weight summing circuit 8. The secondary winding is provided with a center tap shown connected to ground. A fixed capacitor 30 is connected between the other end terminal of the secondary winding and the input of the amplifier 31. A rebalancing potentiometer 27 is connected across the lower half of the secondary winding between the center tap and the last mentioned terminal. The slider of the potentiometer is connected to a fixed capacitor 29 and to the input of the amplifier 31. The transformer 28 is provided with a primary winding which may be connected to a source of alternating current operating at 400 cycles. The amplifier 31 has its input connected to the output of the bridge circuit between ground and its input. The output of the amplifier 31 is coupled to a conventional phase rebalancing motor 32 and to the slider of the potentiometer 27. Thus, in the circuit described if there is any change in the signals from the weight summing circuit 8, this change will be supplied to the motor 31 causing it to reposition the slider of potentiometer 27 in a direction tending to reduce the signal to zero and rebalance the bridge. It will be seen that the position of a suitable servo indicating pointer (not shown) normally connected to the rebalancing potentiometer 27 will continuously change as the weight summing circuit senses the fuel depletion in the tank 2, as previously described, and thus indicate the mass of fluid in the tank.

As previously mentioned, the output of the weight summing circuit 8 is shared with the mass indicator 10 as well as the volume computer or gauge 12. The volume gauge 12 may be of the bridge type similar to that described for the mass gauge 10, but in this case employing a densitometer compensation signal from the densitometer 14 as shown in FIG. 1. It is contemplated, however, that the volume gauge 12 may be a completely digital device, as well as the mass indicator 10, and that the analog devices are presented here merely by way of illustration as one example for carrying out the concept of this invention.

Returning to FIG. 2 and as previously described, it will be seen that the input signal to the AND/OR matrix 16 will combine pitch, roll, volume and acceleration. When any one of a given number of combinations of signals occur, one or more AND gates are fired which, in turn, activate one or more solid state switches 33, 34, 35, 36, 37, 38 as shown by way of example. These switches connect capacitors 39, 40, 41, 42, 43, 44 to a given portion of the secondary of a transformer 45 such that a correcting current of the proper magnitude is fed to the input of amplifier 31 of the mass gauge 10. This corrective current causes the motor 32 to turn and hence moves the pointer of the rebalancing potentiometer to the correct position thereby removing the previous error. Although the above steps have been described sequentially, the action will be so fast as to appear simultaneous with any change of roll, pitch, volume and acceleration.

As a result of utilizing buoyant probe fuel gauging techniques with the principles of this invention, it is possible to reduce the number of probes mounted in the tank 2 and still obtain an accurate indication of the quantity of fuel therein. Further, these buoyant probes need not be profiled as sometimes has been done in the past in the manner that capacitance sensors have been profiled.

It should be understood that the pitch and roll signals 18 and 20 may include changes in attitude due to twist and deflection of wing tanks caused by fuel weight and aerodynamic loading. Suitable sensors for detecting such changes may be conveniently provided for this purpose.

Although only a single embodiment of the invention has been depicted and described, it will be apparent that this embodiment is illustrative in nature and that a number of modifications in the apparatus and variations in its end use may be effected.

That which is claimed is:

1. In an error correction system for use with a fluid gauge employing a container having a quantity of fuel therein, a buoyant means immersed in said fluid, a force-rebalancing servo means positioned above said buoyant means and responsive to changes in weight of said buoyant means, a weight summing circuit connected to said servo means for providing a digital mass signal proportional to the quantity of fluid in said container, indicating means for said mass signal, a densitometer mounted within said container in contact with said fluid, volume computer means connected to said densitometer and said digital mass signal for converting said mass signal to a volume digital signal, a voltage selecting means connected to the output of said volume computer means, a digital signal representing errors associated with said digital mass signal supplied to said voltage selecting means, and a correction signal output from said voltage selecting means being supplied to said mass indicator.

2. In an error correction system for use with a fluid gauge employing a container having a quantity of fluid therein, a buoyant means immersed in said fluid, a force-rebalancing servo means positioned above said buoyant means and responsive to changes in weight of said buoyant means, a weight summing circuit connected to said servo means for providing a digital mass signal proportional to the quantity of fluid in said container, indicating means for said mass signal, a voltage selecting means having a digital input signal representing errors associated with said digital mass signal, volume computing means for converting said digital mass signal to a volume digital signal said volume digital signal being fed to said voltage selecting means, and said voltage selecting means having a correction signal output connected to said mass indicator.

3. In an error correction system for use with a fluid gauge employing a container having a quantity of fluid therein, a buoyant means immersed in said fluid, a force-rebalancing servo means positioned above said buoyant means and responsive to changes in weight of said buoyant means, a weight summing circuit connected to said servo means for providing a digital mass signal proportional to the quantity of fluid in said container, indicating means for said mass signal, AND/OR matrix having a digital input signal representing errors associated with said digital mass signal, volume computing means for converting said digital mass signal to a volume digital signal, said volume digital signal being fed to said AND/OR matrix, and said AND/OR matrix having a correction signal output connected to said mass indicator.

4. In an error correction system for use with a fluid gauge employing a container having a quantity of fluid therein, a buoyant means immersed in said fluid, a force-rebalancing servo means positioned above said buoyant means and responsive to changes in weight of said buoyant means, a weight summing circuit connected to said servo means for providing a digital mass signal proportional to the quantity of fluid in said container, indicating means for said mass signal, a voltage selection means having a digital signal input representing errors associated with said digital mass signal, a volume computing mean for converting said digital mass signal to a digital volume signal, said digital volume signal being fed to said voltage selection means, and said voltage selection means providing a correction signal output to said mass indicator.

5. In an error correction system for use with a fluid gauge employing a container having a quantity of fluid therein, a buoyant means immersed in said fluid, a force-rebalancing servo means positioned above said buoyant means and responsive to changes in weight of said buoyant means, a weight summing circuit connected to said servo means for providing a digital mass signal proportional to the quantity of fluid in said container, a voltage selection means having a digital input signal representing errors associated with said digital mass signal, and a mass indicator connected to said weight summing circuit and said voltage selection means for providing a corrected mass signal.

References Cited

UNITED STATES PATENTS

| | | | |
|---|---|---|---|
| 2,911,828 | 11/1959 | Keating et al. | 73—309 XR |
| 3,120,124 | 2/1964 | Seliger et al. | 73—291 |

LOUIS R. PRINCE, Primary Examiner

F. SHOON, Assistant Examiner

U. S. Cl. X.R.

318—18